Oct. 30, 1962     F. V. MORRISS ETAL     3,061,414
GAS ANALYSIS
Filed July 15, 1960
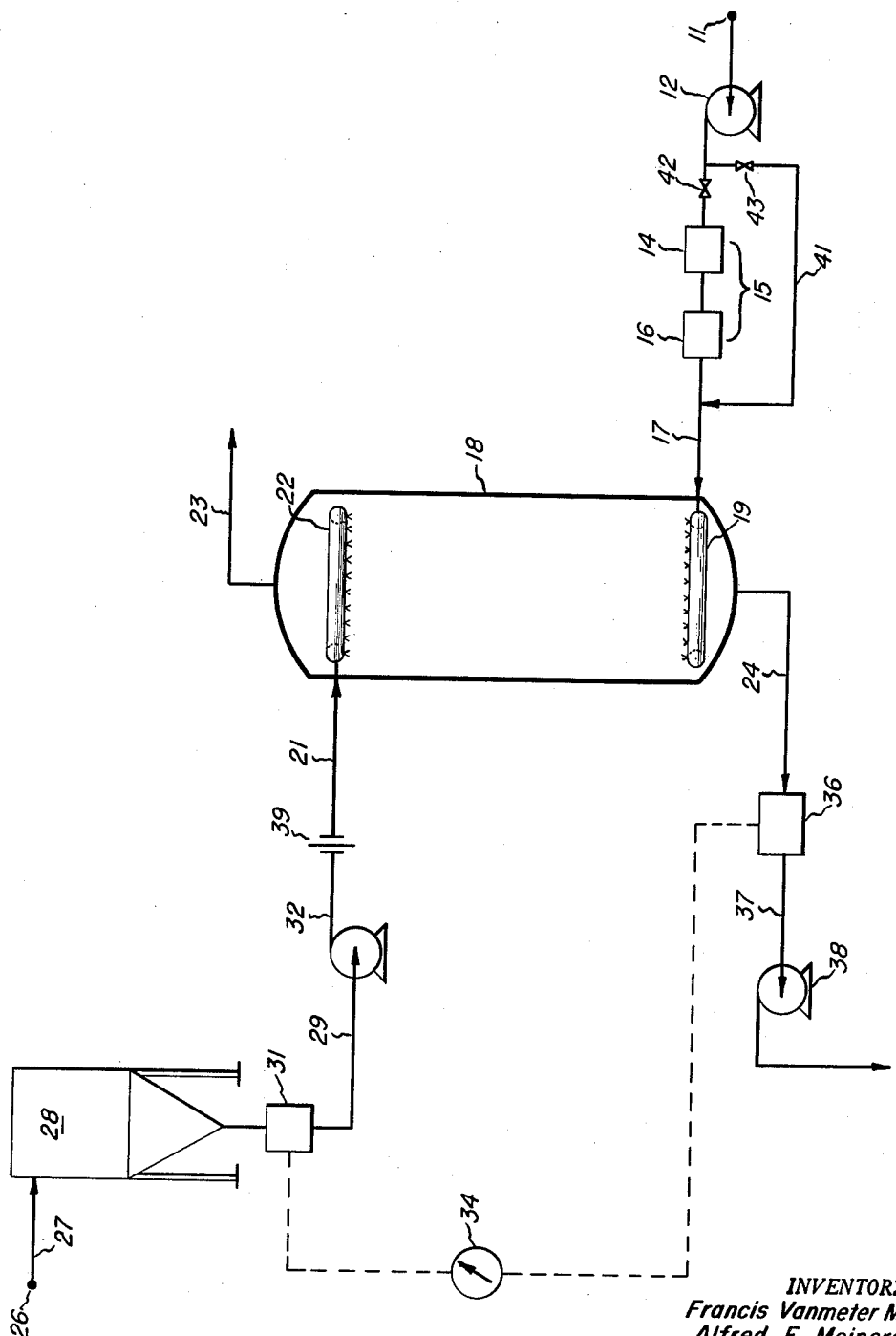
INVENTORS:
Francis Vanmeter Morriss
Alfred F. Meiners
BY
William F. McClain
ATTORNEY

United States Patent Office 3,061,414
Patented Oct. 30, 1962

3,061,414
GAS ANALYSIS
Francis Vanmeter Morriss and Alfred F. Meiners, Kansas City, Mo., assignors, by mesne assignments, to Standard Oil Company, Chicago, Ill., a corporation of Indiana
Filed July 15, 1960, Ser. No. 43,166
10 Claims. (Cl. 23—232)

This invention relates to a method and apparatus for analyzing gases. More particularly, it relates to a method and apparatus for analyzing gases containing low molecular weight mercaptans and/or hydrogen sulfide.

Hydrogen sulfide and the low molecular weight mercaptans are either produced or used in many chemical processes. Because of their highly unpleasant odors and toxic effects, leakage of these gases into the surrounding environment is highly undesirable. A number of methods have been used in the past to detect such leakage. Even in small concentrations, the presence of these gases is readily detected by the nose. As is the case with hydrogen sulfide, continued exposure causes the nose to become insensitive to the gas. One means of determining the presence of hydrogen sulfide in at atmosphere is by use of lead acetate ampules. If a mercaptan leak is suspected, litmus paper which has been dipped in a sodium nitro-prusside solution may be used. However, procedures such as those outlined above are lacking in preciseness and, in general, have been found to be unsatisfactory.

An object of this invention is a method and apparatus for detecting the presence of low molecular weight mercaptans and/or hydrogen sulfide in an otherwise inert gaseous medium by a technique which is rapid, convenient, inexpensive and adapted for field use. Other objects of the invention will be made apparent from a reading of the following description of the invention.

The invention provides a method and apparatus wherein an aqueous iodine solution is contacted with a gaseous medium containing mercaptans and/or hydrogen sulfide. Upon contact with these gases hydroiodic acid is released, which causes a change in the acidity of the aqueous solution. This change in acidity is an increasing function of the concentration of low molecular weight mercaptans and/or hydrogen sulfide. The differential acidity is determined as an indication of the concentration by measuring the pH of the original aqueous iodine solution and the contacted solution.

In one embodiment of the invention a method and apparatus are provided for removing hydrogen sulfide in admixture with low molecular weight mercaptans and an otherwise inert gas medium prior to contacting the mixture with the aqueous iodine solution. This is accomplished by contacting the gaseous mixture in a first contacting zone with an agent reactive only with the hydrogen sulfide to remove the hydrogen sulfide, and subsequently contacting the remaining gases in a second contacting zone with an agent reactive only with acids produced in the first contacting zone to remove such acids. Also, a method and apparatus is provided to detect concentration changes of mixtures of mercaptans and hydrogen sulfide with an otherwise inert atmosphere by contacting the mixture with the aqueous iodine solution and measuring the differential acidity. Further, in a similar manner, concentration changes of hydrogen sulfide in an otherwise inert atmosphere may be determined.

A better understanding of our invention may be had by referring to the following description of the invention and the accompanying drawing which is illustrative of a preferred embodiment of our invention.

The low molecular weight mercaptans, are particularly outstanding for their highly disagreeable odors, but the odor diminishes in unpleasantness for the higher mercaptans as the length of the hydrocarbon chain increases. The following description of this invention refers to the lower molecular weight mercaptans, and particularly to methyl and ethyl mercaptans. For purposes of description methyl mercaptan is used as an example, however, it is contemplated that other mercaptans are within the scope of this invention.

Methyl mercaptans react with aqueous iodine to give dimethyl disulfide and hydrogen iodide with an accompanying decrease in pH indicative of the concentration of the methyl mercaptan by the following reaction:

$$2CH_3SH + I_2 \rightarrow CH_3S\text{—}S\text{—}CH_3 + 2HI$$

This reaction is quantitative in nature and has been found to be rapid enough to give sufficient changes in acidity, as measured by a pH meter, to be useful in measuring changes in concentration of methyl mercaptan.

The concentration of the aqueous iodine solution is not critical, it only being necessary to maintain enough $I_2$ to prevent its complete exhaustion during the reaction. Preferably, the concentration is 0.1 g. of $I_2$ and 0.25 g. of KI per liter. Lower or higher concentrations may be used as convenience dictates, but as explained above, any amount sufficient to maintain enough $I_2$ in the solution may be used.

The presence of hydrogen sulfide in the mixture of methyl mercaptan and an otherwise inert gaseous medium, such as air, causes the oxidation of the hydrogen sulfide by the aqueous iodine to sulfur and hydrogen iodide by the following reaction:

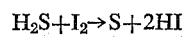

$$H_2S + I_2 \rightarrow S + 2HI$$

Thus, hydrogen sulfide will interfere to some extent with the determination of the concentration of methyl mercaptan, and need be removed from the sample gas in some instances. It has been determined, however, that the change in acidity as a result of this reaction is considerably less then that which accompanies the reaction of the methyl mercaptan with aqueous iodine.

A means of removing the hydrogen sulfide from the sample gas stream may be provided. It is necessary that the means used to effect the removal of hydrogen sulfide from the sample gas stream does not remove or react with mercaptans or other constituents of the mixture of gases in the sample gas. A preferred method of removing the hydrogen sulfide is by passing the sample gas stream over solid lead acetate which removes the hydrogen sulfide quantitatively but releases some acetic acid.

The acetic acid may be removed from the lead acetate-contacted gaseous mixture by any suitable means which acts to effectively remove the released acetic acid without removing other constituents of the sample gas stream. Preferably, anhydrous potassium carbonate is used for this purpose, although other reagents, e.g., alkali metal carbonates, such as sodium or lithium carbonates, may be used to accomplish a similar result with varying degrees of effectiveness.

After a treatment such as described above, the hydrogen sulfide is effectively removed from the sample gas, as well as any acetic acid which may be released, and only mercaptans and the otherwise inert components of the sample gas remain in the gas stream. It has been found that neither lead acetate nor potassium carbonate affect the other constituents of the sample gas and these reagents may be advantageously used for the purposes described. Any convenient form of lead acetate may be used as long as sufficient contact area and sufficient time are provided to effectively remove the hydrogen sulfide. Granular lead acetate, however, has been found to be quite effective and is used preferably. A problem arises when an atmospheric sample is analyzed. It has been observed that pure air, when passed over lead acetate and subsequently through aqueous iodine, causes a decrease in the pH of the iodine solution. This interferes with the analysis, but the disability may be overcome by initially sweeping the lead acetate with air. However, it is preferred to pass the exit gas from the lead acetate contacting zone over a material such as anhydrous potassium carbonate to remove any traces of released acetic acid. It is contemplated that the method and apparatus of the invention will be used to detect changes in the concentrations of mercaptans and/or hydrogen sulfide in air. However, samples containing these gases in a mixture with any otherwise inert gaseous medium not affected by the reagents employed is within the scope of this invention.

Referring to the accompanying drawing wherein is shown a preferred embodiment of an apparatus for analyzing air for methyl mercaptan and hydrogen sulfide, an air sample is taken from the atmosphere at point 11, and a sample introduction means is employed to introduce the sample gas into the apparatus. The sample is passed by pump 12 through line 13 to a hydrogen sulfide removal zone 15, which comprises a lead acetate contactor 14 and a potassium carbonate contactor 16. The effluent from the lead acetate contactor is passed to the potassium carbonate reactor 16 and thence by way of line 17 to the scrubber 18 where the $H_2S$-free sample gas is intimately contacted with an aqueous iodine solution. Preferably, countercurrent flow is established in the scrubber 18 by introducing the sample gas stream into the scrubber 18 near the bottom in the form of a number of small streams. This may be accomplished by introducing the gas through a sparge ring 19. The aqueous iodine solution is passed by line 21 through a similar sparge ring 22 near the top of the scrubber 18. Unreacted gases such as air may be vented from the scrubber through line 23, and the liquid effluent from the scrubber is withdrawn by way of line 24 from the scrubber.

The aqueous iodine solution may be supplied from a source 26 through line 27 to a storage vessel 28. The aqueous iodine is passed by way of line 29 to the scrubber 18, and the acidity of the solution may be measured by means of a pH meter 31. The solution is then passed through line 32 by the pump 33 and through line 21 into the scrubber 18.

A differential pH meter-recorder 34 may be connected to the pH meter 31 and to a similar pH meter 36 which is used to measure the acidity of the effluent in scrubber 18 and the differential in pH used as an indication of the methyl mercaptan concentration in the sample. The effluent may be passed by line 37 and pump 38 to a disposal system.

While the drawing and the above description indicate the use of two pH meters 31 and 36 with a differential pH meter-recorder 34, it is contemplated that a single pH meter 36, of the continuous reading type, may be used in the apparatus where the pH of the iodine solution supplied from source 26 remains substantially constant.

In a typical operation of the above described apparatus the sample gas flow from source 11 is regulated between about 0.01 and 0.1 c.f.m. and passed by line 13 to the hydrogen sulfide removal zone, e.g., the lead acetate contactor 14 and the potassium carbonate contactor 16. Greater or lesser flow rates may be used, but for a given contactor size, the efficiency of contact with the aqueous iodine drops off at high rates. Lower rates of sample gas flow may be desirable when mercaptan and/or hydrogen sulfide concentrations are high because of increased sensitivity at the lower flow rates.

The initial aqueous iodine solution, preferably containing about 0.1 g. of $I_2$ and 0.25 g. of KI per liter, is passed from the storage vessel 28 through a cell of the pH meter 31 into the contacting vessel 18 at a flow rate of about 1 to 10 milliliters per minute. Greater or lesser flow rates of aqueous iodine solution may be used however, and the flow rate preferably is controlled by an orifice 39 in the line 21. The orifice 39 may be of the constant flow type or may be a variable orifice, such as a needle valve. Relatively large flow rates are advantageous because the sensitivity and speed of response of the instrument is increased by increased aqueous iodine solution flow rates.

Advantageously, pH meters 31 and 36 are employed to measure the acidity of the initial aqueous iodine solution and the scrubber effluent, respectively. In general, the pH meters operate on the principle of determining change in electrical conductivity of an electrolyte as a measure of the pH, or change in acidity. It is contemplated, however, that any suitable means of determining changes in acidity may be employed for this purpose. To lend increased portability to the apparatus of the invention, small battery operated pH meters of the type described are preferably used.

The foregoing description contemplates apparatus adapted to analyze a sample gas containing $H_2S$. In the event, however, that $H_2S$ is not present in the sample gas, or that it is not desired to remove the $H_2S$, the $H_2S$ removal zone may be eliminated from the apparatus, or a valved by-pass line 41 may be employed to by-pass the $H_2S$ removal zone. This operation is carried out in a manner similar to that described above by closing valve 42 and opening valve 43 to eliminate the lead acetate and potassium carbonate contacting steps. In this manner the above described apparatus may be used to detect concentration changes of hydrogen sulfide, mercaptans free of hydrogen sulfide or mixtures of mercaptans and hydrogen sulfide.

The apparatus as described above is particularly useful for making a continuous measurement of the concentration of mercaptans in air, since, at the indicated flow rates, the reactions do not go to completion. By this method the pH gives a logarithmic response to increased concentrations of mercaptan, and sensitivity increases logarithmically as concentration decreases.

As an example of the accuracy and efficiency of analysis by the method hereinbefore described, the following Table I and Table II are used to show the results of this type analysis. Samples of pure air, pure air with about 45 p.p.m. methyl mercaptan, pure air with about 45 p.p.m. hydrogen sulfide and pure air with about 45 p.p.m. hydrogen sulfide plus about 45 p.p.m. methyl mercaptan were prepared and analyzed with and without the use of various absorbents.

TABLE I

Reaction of Methyl Mercaptan With Aqueous Iodine [1]

| Gas Concentration | Solid Absorbents | pH of Resulting Solution | pH Difference |
|---|---|---|---|
| MeSH, 45 p.p.m. | None | 3.75 | 2.90 |
| Pure air | do | 6.75 | |
| MeSH, 45 p.p.m. | do | 3.72 | 3.03 |
| Pure air | Pb(OAc)$_2$ | 5.65 | 1.10 |
| Do | do | 6.35 | [2] 0.40 |
| Do | do | 4.53 | 2.32 |
| Do | Pb(OAc)$_2$,K$_2$CO$_3$ | 6.75 | 0.10 |
| Do | K$_2$CO$_3$ | 6.75 | 0.10 |
| MeSH, 45 p.p.m. | do | 3.75 | 3.10 |

[1] The iodine solution contained 0.15 g./liter of iodine and 0.3 g. of potassium iodide, pH=6.70, 10 ml.
[2] The Pb(OAc)$_2$ tube was initially swept out with about 1 cu. ft. of air.

TABLE II

*Reaction of Methyl Mercaptan in the Presence of Hydrogen Sulfide With Aqueous Iodine* [1]

| Gas Concentration | Solid Absorbents | pH of Resulting Solution | pH Difference |
|---|---|---|---|
| MeSH, 45 p.p.m. | Drierite (indicating), Pb(OAc)$_2$, K$_2$CO$_3$. | 4.40 | 2.50 |
| H$_2$S, 45 p.p.m. | -----do----- | 6.90 | 0.01 |
| H$_2$S, 45 p.p.m. | None | 4.00 | 2.89 |
| Pure air | Drierite, Pb(OAc)$_2$, K$_2$CO$_3$. | 6.77 | -------- |
| H$_2$S, 45 p.p.m. + MeSH, 45 p.p.m. | -----do----- | 3.90 | 2.97 |

[1] The iodine solution contained 0.15 g./liter of iodine and 0.3 g./liter of potassium iodide, pH=6.87, 10 ml.

The "Drierite" drying agent which is indicated in Table II as being used prior to the lead acetate and potassium carbonate contacting steps may be used when necessary, but for most purposes it is not necessary. As indicated in Tables I and II, methyl mercaptan is unaffected by "Drierite," lead acetate and potassium carbonate, giving pH differences as high as when no solid absorbents were used. On the other hand, hydrogen sulfide is quantitatively absorbed by this system. Although, with no absorbents, hydrogen sulfide gave greater pH differences than methyl mercaptan, hydrogen sulfide caused no significant pH change when the absorbents were used. Additionally, methyl mercaptan in the presence of H$_2$S resulted in the same range of pH differences as methyl mercaptan alone.

Thus, it is apparent that we have provided a method and apparatus to accurately and efficiently detect changes in concentration of a gas sample containing low molecular weight mercaptans and/or hydrogen sulfide.

Having described our invention, we claim:

1. A method of detecting concentration changes of low molecular weight mercaptans in admixture with an otherwise inert gaseous medium which method comprises contacting said mixture with an aqueous iodine solution of a known acidity and measuring the change in acidity of said contacted solution as an indication of the change in concentration of said mercaptans.

2. A method for detecting concentration changes of low molecular weight mercaptans in admixture with hydrogen sulfide and an otherwise inert gaseous medium which method comprises contacting said mixture with a lead salt reactive only with said hydrogen sulfide in a first contacting zone to remove said hydrogen sulfide, subsequently contacting the effluent from said first zone with an alkali metal salt reactive with said acid products released in said first zone to remove said acid, contacting the effluent from said second contacting zone with an aqueous iodine solution of a known acidity and measuring the change in acidity of said gas-contacted-solution as an indication of the change in concentration of said mercaptans.

3. The method of claim 2 wherein the agent employed in said first contacting zone is lead acetate.

4. The method of claim 2 wherein the agent employed in said second contacting zone is an alkali metal carbonate.

5. The method of claim 4 wherein said alkali metal carbonate is potassium carbonate.

6. A method of detecting concentration changes of low molecular weight mercaptans-hydrogen sulfide mixtures in admixture with an otherwise inert gaseous medium which method comprises contacting said mixture with an aqueous iodine solution of a known acidity and measuring the change in acidity of said contacted solution as an indication of the change in concentration of said mercaptans-hydrogen sulfide mixture.

7. A method for detecting concentration changes of low molecular weight mercaptans in admixture with hydrogen sulfide and an otherwise inert gaseous medium which method comprises contacting said mixture with lead acetate in a first contacting zone to remove said hydrogen sulfide, subsequently contacting the effluent from said first zone with anhydrous potassium carbonate, contacting the effluent from said second contacting zone with an aqueous iodine solution of a known acidity and measuring the change in acidity of said gas-contacted solution as an indication of the change in concentration of said mercaptans.

8. The method of claim 7 wherein said aqueous solution contains iodine and potassium iodide.

9. The method of claim 1 wherein said aqueous solution contains iodine and potassium iodide.

10. The method of claim 6 wherein said aqueous solution contains iodine and potassium iodide.

References Cited in the file of this patent

FOREIGN PATENTS 529,281      Canada ---------------- Aug. 21, 1956

OTHER REFERENCES

Kolthoff et al.: "Anal. Chem.," 21, 963–965 (1949).

UNITED STATES PATENT OFFICE
CERTIFICATE OF CORRECTION

Patent No. 3,061,414

October 30, 1962

Francis Vanmeter Morriss et al.

It is hereby certified that error appears in the above numbered patent requiring correction and that the said Letters Patent should read as corrected below.

Column 1, line 24, for "at" read -- an --; same line 24, after "by" insert -- the --; column 2, line 43, for "then" read -- than --; in the column of line numbers between columns 1 and 2, after line 40, the numbers are upside down and should read -- 45 --; -- 50 --; -- 55 --, -- 60 --, and -- 65 --; column 5, TABLE II, third column, line 4 thereof, for "6.77" read -- 6.87 --.

Signed and sealed this 23rd day of April 1963.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,061,414

October 30, 1962

Francis Vanmeter Morriss et al.

It is hereby certified that error appears in the above numbered patent requiring correction and that the said Letters Patent should read as corrected below.

Column 1, line 24, for "at" read -- an --; same line 24, after "by" insert -- the --; column 2, line 43, for "then" read -- than --; in the column of line numbers between columns 1 and 2, after line 40, the numbers are upside down and should read -- 45 --; -- 50 --; -- 55 --, -- 60 --, and -- 65 --; column 5, TABLE II, third column, line 4 thereof, for "6.77" read -- 6.87 --.

Signed and sealed this 23rd day of April 1963.

(SEAL)
Attest:

ERNEST W. SWIDER
Attesting Officer

DAVID L. LADD
Commissioner of Patents